(12) United States Patent
Xing

(10) Patent No.: US 7,106,035 B2
(45) Date of Patent: Sep. 12, 2006

(54) INDUCTOR CURRENT SENSING SCHEME FOR PWM REGULATOR

(75) Inventor: Kun Xing, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 180 days.

(21) Appl. No.: 10/804,340

(22) Filed: Mar. 19, 2004

(65) Prior Publication Data
US 2005/0179423 A1    Aug. 18, 2005

Related U.S. Application Data

(60) Provisional application No. 60/545,367, filed on Feb. 18, 2004.

(51) Int. Cl.
*G05F 1/56* (2006.01)
(52) U.S. Cl. ...................................... 323/282
(58) Field of Classification Search ............... 323/272, 323/277, 282, 283, 284, 285, 351
See application file for complete search history.

(56) References Cited
U.S. PATENT DOCUMENTS 5,982,160 A * 11/1999 Walters et al. .............. 323/282
6,646,450 B1 * 11/2003 Liebler ....................... 324/630
6,812,677 B1 * 11/2004 Walters et al. .............. 323/277
6,833,690 B1 * 12/2004 Walters et al. .............. 323/277
6,870,352 B1 * 3/2005 Walters et al. .............. 323/277

* cited by examiner

*Primary Examiner*—Adolf Berhane
(74) *Attorney, Agent, or Firm*—Gary R. Stanford

(57) ABSTRACT

An inductor current measurement scheme generates an output voltage as a function of inductor current in a pulse width modulation-based DC—DC voltage converter. The converter has an upper controlled switch and a lower controlled switch coupled in series between an input voltage terminal and a reference voltage terminal. A common connection of the upper controlled switch and the lower controlled switch provides a phase node voltage. An inductor L and a parasitic direct current resistance (DCR) are coupled between the phase node and an output node coupled to a load. The scheme generates a sense current as a function of the difference between the phase node voltage and the output voltage. This sense current is then supplied to a resistor-capacitor network comprised of a resistor Rs and a capacitor Cs, wherein the product of $Rs*Cs=L/DCR$, so as to produce a voltage across the resistor-capacitor network that is proportional to the inductor current.

5 Claims, 2 Drawing Sheets

INDUCTOR CURRENT SENSING SCHEME FOR PWM REGULATOR

CROSS-REFERENCE TO RELATED APPLICATION

The present application claims the benefit of previously filed, co-pending application Ser. No. 60/545,367, filed. Feb. 18, 2004, by K. Xing, entitled: "An Inductor Current Sensing Scheme for PWM Regulators," assigned to the assignee of the present application and the disclosure of which is incorporated herein.

FIELD OF THE INVENTION

The present invention relates to DC—DC converters and is particularly directed to a new and improved circuit architecture for sensing current in the output inductor coupled to an output load of a pulse width modulator (PWM) driven DC—DC converter.

BACKGROUND OF THE INVENTION

FIG. 1 is a reduced complexity illustration of a typical buck mode DC—DC converter, having an upper switch SWU and a lower switch SWL, each of which is customarily implemented as a field effect transistor, coupled in series between a source of input voltage Vin and a reference terminal (e.g., ground). An inductor is coupled between the common node 10 between the two switches (node 10 often referred to as the phase node) and an output node 20 to which a capacitor C is coupled. In the schematic illustration of FIG. 1, the inductor has been shown as a parasitic resistor DCR (direct current resistance) in series with an inductor L. Respective upper gate drive and lower gate drive signals are applied to the gates of the MOSFETs of which the upper and lower switches SWU and SWL are respectively configured, so that the switches are turned on and off in a complementary manner.

In order to achieve certain control related to inductor or load current and provide over-current protection for the converter, current information is required. This has been traditionally obtained by sensing the voltage or current of the components connected to the phase node, such as the lower switch, the upper switch and the inductor. On conventional implementation for this purpose is diagrammatically illustrated in FIG. 2, which has series-coupled resistor Rs and capacitor Cs connected in parallel with the inductor L. The R and C construct a low pass filter which will filter out the ac voltage. And the voltage across the capacitor will reflect the current information through the inductor L. Namely, this voltage can be used to measure inductor current. Typically, however, the value of this voltage is only in the millivolt range as the DCR is generally measured in milliohm range.

SUMMARY OF THE INVENTION

In accordance with the present invention, there is provided a new and improved measurement circuit for sensing the current through the output inductor of a PWM regulator, in a manner that enjoys a considerably improved signal-to-noise ratio compared with the conventional sensing scheme described above. To this end the invention incorporates as part of the PWM controller for the converter, a current generator that is operative to generate a sense current Isense, that is a function of the phase node voltage and the output voltage, in particular, a function of the difference between the phase node voltage and the output voltage, so that Isense=K(Vphase−Vout) in which K is a constant. This sense current Isense is then applied via an Isen port to a parallel resistor-capacitor network Rs and Cs coupled to ground. With the precursor requirement that Rs*Cs=L/DCR, the voltage across Rs and Cs is representative of inductor current. This voltage can be shifted up or down as desired to provide offsets in various applications as required.

A principal benefit of the inductor measurement circuit of the invention is the fact that it uses large magnitude signals, such as phase node and output voltage signals, to generate current information in a sensing circuit separated from the power converter, so that it has a very high signal-to-noise ratio. The voltage on the sensing circuit is referenced to the operational ground of the IC, so that it enjoys good noise immunity. In addition, it employs the parasitic resistance of the inductor and does not generate additional power loss, so that it offers the convenience for control and over current protection of the PWM regulator. It should also be noted that this circuit can be used for other types of PWM regulator, such as, but not limited to, boost and buck-boost type regulators.

DETAILED DESCRIPTION

Figure 1:
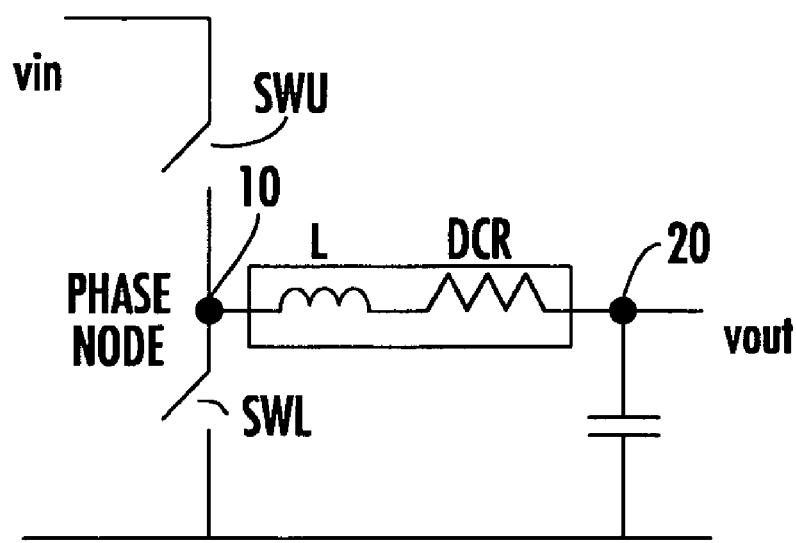
FIG. 1 is a reduced complexity illustration of a typical buck mode DC—DC converter.
Figure 2:
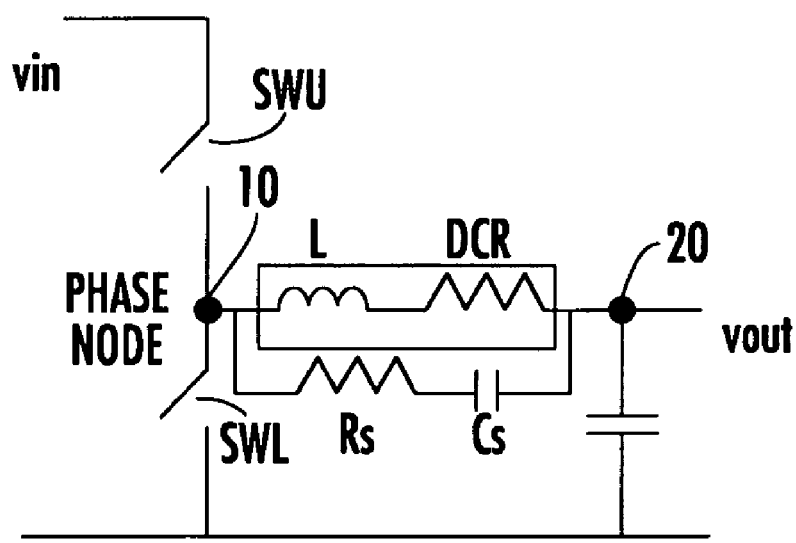
FIG. 2 shows a conventional implementation of a circuit having series-coupled resistor Rs and capacitor Cs connected in parallel with the inductor L of the circuit of FIG. 1, for deriving load current information.
Figure 3:
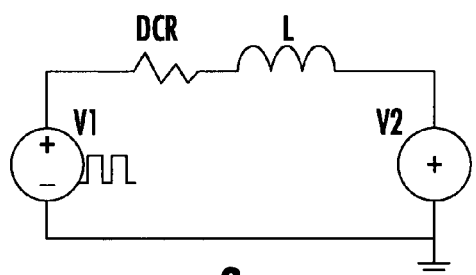
FIG. 3 diagrammatically illustrates an equivalent circuit around the inductor branch represented as a pair of voltages applied to its end terminals.

Attention is now directed to FIG. 3, which diagrammatically illustrates an equivalent circuit around the inductor branch being represented as a pair of voltages applied to its end terminals. In this circuit diagram V1 represents the phase node voltage as a square wave produced by the upper and lower switches SWU and SWL, while V2 is the output voltage. An associated dual circuit of this network may be represented as shown in FIG. 4, where the current sources I1 and I2 are proportional to the voltages V1 and V2, respectively, with the time constant of the components Rs and Cs being matched with that of the inductor branch.

Figure 4:
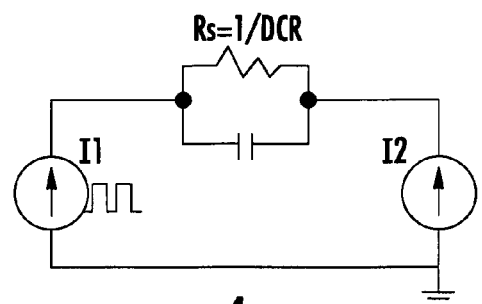
FIG. 4 is an associated dual circuit of the network of FIG. 3, having current sources I1 and I2 proportional to the voltages V1 and V2, respectively, with the time constant of the components Rs and Cs being matched with that of the inductor branch.
Figure 5:
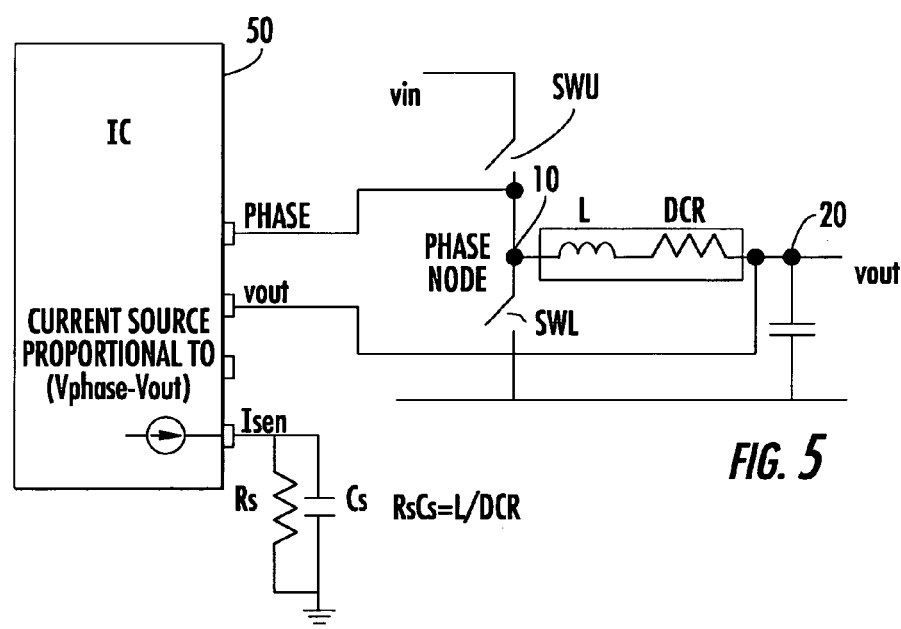
FIG. 5 shows the application of the circuit of FIG. 4 to an integrated circuit (IC) PWM controller.

FIG. 5 shows the application of the circuit of FIG. 4 to an integrated circuit (IC) PWM controller 50. In this circuit, the phase node voltage and the output voltage are sensed by the controller IC 50, which generates a sense current Isense that is proportional to the difference between the phase node voltage Vphase and the output voltage Vout. This sense current is then applied via an Isen port to a parallel resistor-capacitor network Rs and Cs coupled to ground. With the precursor requirement that Rs*Cs=L/DCR, the voltage across Rs and Cs is representative of inductor current. This voltage can be shifted up or down as desired to provide offsets in various applications as required.

A principal benefit of the circuit of FIG. 5 is the fact that it uses large magnitude signals, such as phase node and output voltage signals, to generate current information in a sensing circuit separated from the power converter, so that it has a very high signal-to-noise ratio. The voltage on the sensing circuit is referenced to the operational ground of the IC, so that it enjoys good noise immunity. Further, as pointed out above, it employs the parasitic resistance of the inductor and does not generate additional power loss, so that it offers the convenience for control and over current protection of the PWM regulator. It should also be noted that this circuit can be used for other types of PWM regulator, such as, but not limited to, boost and buck-boost type regulators.

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed is:

1. An arrangement for generating an output voltage as a function of inductor current in a pulse width modulation-based DC—DC voltage converter, having an upper controlled switch and a lower controlled switch coupled in series between an input voltage terminal and a reference voltage terminal, a common connection of said upper controlled switch and said lower controlled switch providing a phase node voltage, an inductor coupled between said phase node and an output node arranged to be coupled to a load, comprising:

a controller which is operative to monitor said phase node voltage and an output voltage at said output node, and is operative to generate a sense current as a function of the difference between said phase node voltage and said output voltage; and a resistor-capacitor network comprised of a resistor Rs and a capacitor Cs coupled to receive said sense current and referenced to a constant voltage and producing a voltage thereacross that is proportional to said inductor current.

2. The arrangement according to claim 1, wherein said inductor is comprised of series circuit of an inductor component L and a direct current resistance component DCR, and wherein the product of Rs*Cs=L/DCR.

3. The arrangement according to claim 1, wherein said resistor-capacitor network is referenced to ground.

4. A method for generating an output voltage as a function of inductor current in a pulse width modulation-based DC—DC voltage converter, having an upper controlled switch and a lower controlled switch coupled in series between an input voltage terminal and a reference voltage terminal, a common connection of said upper controlled switch and said lower controlled switch providing a phase node voltage, an inductor L and a parasitic direct current resistance (DCR) coupled between said phase node and an output node arranged to be coupled to a load, said method comprising the steps of:

(a) monitoring said phase node voltage and an output voltage at said output node, and generating a sense current as a function of the difference between said phase node voltage and said output voltage; and (b) supplying said sense current to a resistor-capacitor network comprised of a resistor Rs and a capacitor Cs referenced to a constant voltage, wherein the product of Rs*Cs=L/DCR, so as to produce a voltage across said resistor-capacitor network that is proportional to said inductor current.

5. The method according to claim 4, wherein said resistor-capacitor network is referenced to ground.

* * * * *